Oct. 6, 1942.           G. F. D'ALELIO           2,298,039
INTERPOLYMER OF DIMETHYL ITACONATE AND ETHYL METHACRYLATE
Filed Sept. 12, 1939
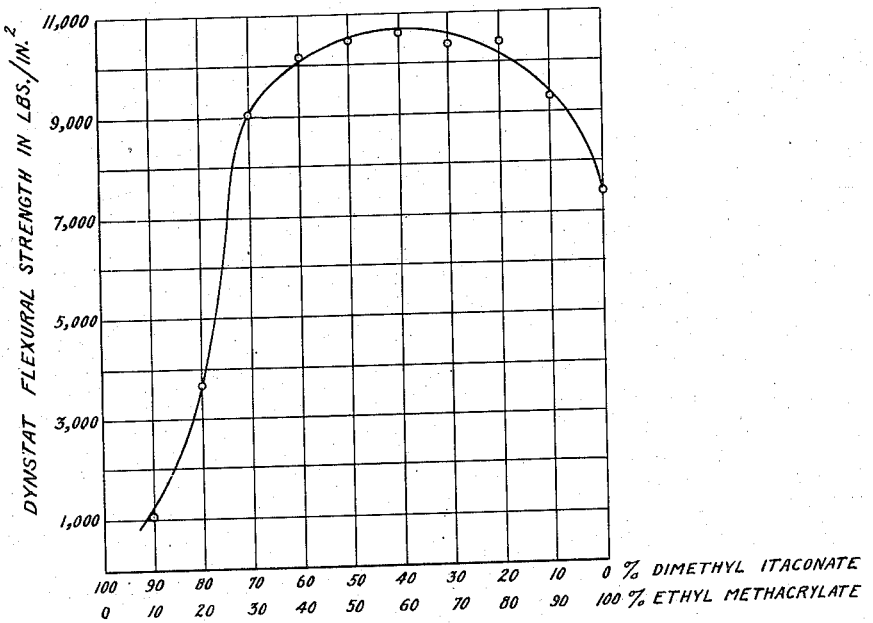
Inventor:
Gaetano F. D'Alelio,
by Harry E. Dunham
His Attorney.

Patented Oct. 6, 1942

2,298,039

UNITED STATES PATENT OFFICE 2,298,039

INTERPOLYMER OF DIMETHYL ITACONATE AND ETHYL METHACRYLATE

Gaetano F. D'Alelio, Pittsfield, Mass., assignor to General Electric Company, a corporation of New York Application September 12, 1939, Serial No. 294,498

15 Claims. (Cl. 260—84)

This invention relates to the production of interpolymers (copolymers) having valuable and characteristic properties that make them especially suitable for use in industry, for example, in molding, laminating, casting, coating and adhesive applications, and for other purposes. The invention is concerned more particularly with compositions of matter comprising interpolymers of dimethyl itaconate and ethyl methacrylate; also, to compositions comprising interpolymers of the said esters and at least one other polymerizable compound, for example a polymerizable compound containing at least one

grouping.

Dimethyl itaconate and ethyl methacrylate previously have been reported in the literature [see Berichte, 14, 2786-7 (1881), Richter's "Organic Chemistry," vol. 1, p. 297, 2nd ed.]. Polymerized dimethyl itaconate is described as a hard, brittle, readily friable and easily shattered mass. Polymeric ethyl methacrylate, because of its softness and low flexural strength, heretofore has found little utility as such. Much to my surprise I have found that compositions of outstanding utility can be obtained by interpolymerizing these esters alone or in the presence of one or more other polymerizable compounds. The resultant interpolymers are particularly valuable, by reason of their exceptional properties, when the ratio of dimethyl itaconate to ethyl methacrylate is kept within certain proportions. For example, polymeric dimethyl itaconate was found to be so brittle that its flexural strength could not be measured. Polymeric ethyl methacrylate alone had a Dynstat flexural strength of 7,450 pounds per square inch. But when monomeric dimethyl itaconate and monomeric ethyl methacrylate in the ratio of, by weight, 40 parts of the former to 60 parts of the latter were copolymerized under the same conditions employed in polymerizing the individual components, there resulted a hard, tough copolymer which, surprisingly, had a Dynstat flexural strength of 10,650 pounds per square inch.

Various proportions of components may be used in preparing the copolymers of this invention, but ordinarily the ethyl methacrylate will constitute at least 20 per cent by weight of the mixed monomers or partial polymers. Thus, 1 per cent by weight dimethyl itaconte may be copolymerized with 99 per cent by weight ethyl methacrylate to yield a copolymer having a higher flexural strength than polymeric ethyl methacrylate alone. In general, I prefer to interpolymerize monomeric or partially polymerized ethyl methacrylate with monomeric or partially polymerized dimethyl itaconate in the ratio of, by weight, from 25 to 95 per cent of the former to from 5 to 75 per cent of the latter, since within these ratios the products have the hardness and toughness requisite for all ordinary commercial applications. Products of exceptional hardness, toughness and flexural strength are obtained when from 30 to 90 per cent by weight ethyl methacrylate is copolymerized with from 10 to 70 per cent by weight dimethyl itaconate.

Other modifying bodies may be incorporated into the composition before, during or after the polymerization. These modifying bodies may be of high or low molecular weight, with or without resinous characteristics. The modifying body may be a polymerizable compound or compounds, more particularly compounds having a

grouping. Any desired amount of one or more polymerizable compounds may be used in preparing the modified dimethyl itaconate-ethyl methacrylate compositions of this invention. In the modified compositions, just as in the two-component systems, the ratio of ethyl methacrylate to dimethyl itaconate preferably is maintained at from 25 to 95 per cent of the former to from 5 to 75 per cent of the latter.

Illustrative of the polymerizable compounds which may be copolymerized with monomeric or partly polymerized dimethyl itaconate and ethyl methacrylate in preparing copolymers of this invention are the vinyl-type compounds, more particularly vinyl esters such as the oxalate, acetate, propionate, etc., vinyl halides as the chloride, fluoride, bromide, etc., vinylidene halides as the chloride, bromide, fluoride, etc., vinyl hydrocarbons such styrene, methstyrene, divinyl benzene, etc., vinyl ketones such as vinyl ketone, methyl vinyl ketone, methyl methvinyl ketone, etc., acrylic and methacrylic esters, e. g., methyl acrylate, ethyl acrylate, propyl acrylate, butyl acrylate, methyl methacrylate, methallyl methacrylate, propyl methacrylate, butyl methacrylate, etc., esters of polybasic acids in which at least two ester groups contain unsaturated hydrocarbon radicals, more particularly esters of polybasic acids in which at least two ester groups each contain at least one

grouping, e. g., polyallyl and polymethallyl esters of saturated polycarboxylic acids such as oxalic, malonic, succinic, glutaric, adipic, pimelic, suberic, sebacic, citric, tricarballylic, etc.

Heat, light, or heat and light may be used to effect copolymerization between the components, although under such conditions the rate of polymerization is relatively slow. Hence, to accelerate the polymerization I prefer to use a catalyst accompanied by heat, light, or heat and light. Examples of polymerization catalysts which may be intimately associated with the mixed monomers or partial polymers to effect copolymerization therebetween are oxygen, ozone, hydrogen peroxide, sulfuric acid, aluminum chloride, boron fluoride, super-oxides such as aliphatic acyl peroxides, e. g., acetyl peroxide, stearyl peroxide, etc., peroxides of the aromatic acid series, e. g., benzoyl peroxide. Benzoyl peroxide is the preferred catalyst because of its ease of handling, its relative freedom from explosive hazards and its ready solubility in the monomeric or partially polymerized materials. The rate of polymerization is a function of the temperature, and may be carried out at from room temperature (20° to 30° C.) to temperatures materially above 100° C., for example about 130° C.

In order that those skilled in the art better may understand how the present invention may be carried into effect, the following illustrative examples are given. All parts are by weight.

*Example 1*

In preparing the compositions of this example 0.02 part benzoyl peroxide was incorporated into mixtures of monomeric dimethyl itaconate and monomeric ethyl methacrylate in the proportions stated below. The resulting mixture was heated first at 55° C. for 48 hours, followed by further heating at 85° C. for 31 hours. The resultant glass-clear, water-white copolymers were tested by standard methods. The values of the flexural strengths are tabulated below and are graphically shown in the single figure of the accompanying drawing.

| Dimethyl itaconate | Ethyl methacrylate | Dynstat flexural strength |
|---|---|---|
| *Percent* | *Percent* | *Lbs.-sq. in.* |
| 100 | 0 | (1) |
| 90 | 10 | 1,040 |
| 80 | 20 | 3,630 |
| 70 | 30 | 9,100 |
| 60 | 40 | 10,200 |
| 50 | 50 | 10,510 |
| 40 | 60 | 10,650 |
| 30 | 70 | 10,300 |
| 20 | 80 | 10,420 |
| 10 | 90 | 9,130 |
| 0 | 100 | 7,450 |

[1] Too brittle to measure.

As shown by the above data, when as little as 10% dimethyl itaconate was copolymerized with 90% ethyl methacrylate, the resultant copolymer showed a flexural strength approximately 22.5% more than that of polymeric ethyl methacrylate alone. It also is to be noted that the copolymer of 10% ethyl methacrylate and 90% dimethyl itaconate had a fluexural strength of 1,040 pounds per square inch, while the strength of polymeric dimethyl itaconate alone was too brittle to measure. That the results are wholly unexpected and unpredictable is further evidenced by the fact that when the amount of ethyl methacrylate used in the production of the copolymer was increased from 10% to 20%, and from 10% to 30%, there was an increase in the flexural strength of the copolymer of approximately 249% and 775% respectively. An increase of the ethyl methacrylate ratio from 10% to 60% resulted in approximately 924% increase in the flexural strength of the copolymer.

*Example 2*

| | Parts |
|---|---|
| Dimethyl itaconate | 30 |
| Ethyl methacrylate | 70 |
| Vinyl acetate | 11 | were copolymerized as described under Example 1. The copolymer had a Dynstat flexural strength of 10,280 pounds per square inch, which is substantially the same strength as that of the copolymer of 30 parts dimethyl itaconate and 70 parts ethyl methacrylate.

*Example 3*

| | Parts |
|---|---|
| Dimethyl itaconate | 30 |
| Ethyl methacrylate | 70 |
| Ethyl acrylate | 11 | were copolymerized as described under Example 1. The copolymer had a Dynstat flexural strength of 8,470 pounds per square inch.

The solvent resistance of dimethyl itaconate-ethyl methacrylate polymeric compositions can be increased, or insoluble, infusible or insoluble and infusible copolymers can be obtained, by incorporating with the monomers or partial polymers diallyl itaconate or similar active polymerizable materials having a functionality greater than two. The following example illustrates the production of a copolymer of increased solvent resistance as compared with a copolymer of the same proportions of dimethyl itaconate and ethyl methacrylate.

*Example 4*

| | Parts |
|---|---|
| Dimethyl itaconate | 20 |
| Ethyl methacrylate | 80 |
| Diallyl itaconate | 0.3 | were mixed and copolymerized as in Example 1. A clear, colorless, hard copolymer having a Dynstat flexural strength of 9,070 pounds per square inch was obtained.

The copolymers of this invention may be obtained in many forms. The following examples illustrate the preparation of granular interpolymers of this invention.

*Example 5*

| | Parts |
|---|---|
| Ethyl methacrylate | 21 |
| Dimethyl itaconate | 9 |
| Diallyl itaconate | 0.3 |
| Benzoyl peroxide (dissolved in the above) | 0.6 |
| Water | 150 |
| Sodium polyitaconate | 0.3 | were mixed and the polymerizable materials copolymerized by heating the mixture at 85°–90° C. for 2 hours with stirring. Twenty-five (25) parts of small, clear, colorless beads or granules of the copolymer were obtained by filtration of the above solution at the end of the polymerization period.

Example 6

| | Parts |
|---|---|
| Ethyl methacrylate | 20.0 |
| Dimethyl itaconate | 10.0 |
| Benzoyl peroxide (dissolved in the above) | 0.3 |
| Water | 130.0 |
| Poly-itaconic acid in 10 parts water | 0.3 |
| Sodium hydroxide | 0.3 | were mixed and the polymerizable materials copolymerized by heating the mixture at 90°–100° C. for 3 hours. Twenty-five (25) parts of very fine beads or granules were obtained. The granules were dried and then molded at 140° C. under a pressure of 4000 pounds per square inch, yielding hard, clear molded articles.

The copolymers of this invention may be obtained in solution or dispersion form as illustrated in the following example.

Example 7

| | Parts |
|---|---|
| Ethyl methacrylate | 21 |
| Dimethyl itaconate | 9 |
| Benzoyl peroxide | 0.3 |
| Cellulose acetate | 6 |
| Ethyl alcohol | 25 |
| Benzene | 25 |
| Butyl acetate | 15 |
| Acetone | 30 |
| Dimethyl phthlate | 1 | were heated at 50° C. for 98 hours (or shorter time under reflux) with constant stirring, resulting in a clear solution. The evaporation of the solvent from this solution produces clear, colorless films with such plasticity that they may be heat-pressed to other surfaces without an additional bonding agent. In the above formulation the solvent balance may be considerably varied, or other solvents may be used, so that the mixture of solvents may act as the viscosity- and solubility-controlling ingredient.

The copolymers of Examples 4 and 5 may be obtained in insoluble, infusible form by suitably increasing the ratio of the infusibility-imparting body. Thus, insoluble infusible masses may be obtained when approximately 15 or 20 or more parts diallyl itaconate or the like are copolymerized with 100 parts of the other components comprising the interpolymers.

The diallyl itaconate of Examples 4 and 5 may be replaced in whole or in part by other highly active polymerizable materials, for example allyl and methallyl esters of polybasic acids such, for instance, as diallyl carbonate, diallyl oxalate, diallyl malonate, diallyl succinate, diallyl glutarate, diallyl adipate, diallyl pimelate, diallyl suberate, diallyl azelaate, diallyl sebacate, diallyl alpha dimethyl malonate, diallyl alpha allyl malonate, diallyl maleate, diallyl fumarate, diallyl phthalate, diallyl tartrate, triallyl citrate, triallyl tri-carballylate, diallyl citraconate, diallyl mesaconate, diallyl glutaconate, diallyl hydromucate, diallyl glutinate, tetra-allyl symmetrical ethane tetracarboxylate; or by polyhydric alcohol and unsaturated alcohol esters of acrylic and methacrylic acids, for example glycol acrylate, glycol dimethacrylate, allyl acrylate, allyl methacrylate, methallyl acrylate, methallyl methacrylate, etc.; or by mixtures of such highly active polymerizable materials. Diallyl itaconate, diallyl maleate, diallyl fumurate, diallyl citraconate and diallyl mesaconate are examples of diallyl esters of alpha ethylenic unsaturated alpha beta polycarboxylic acids.

The properties of dimethyl itaconate-ethyl methacrylate copolymers and of interpolymers of these esters with other polymerizable bodies can be considerably varied by varying the ratios of the components. Products having properties best suited for a particular service application also can be obtained by suitable selection of the polymerizable or non-polymerizable modifying body which is incorporated with the dimethyl itaconate and ethyl methacrylate before, during or after copolymerization of the said esters. In these ways products can be obtained varying from fluid compositions of varied intrinsic viscosity or soft, flexible bodies to hard, rigid masses that can be swelled or dissolved in many solvents, even those of a hydrocarbon nature, and insoluble, infusible bodies practically resistant to the destructive effect of other chemical bodies such as acids, bases, solvents and the like.

When a plasticizing effect is desired in some other synthetic or natural plastic or potentially plastic material, the new interpolymers of this invention are particularly suited for that purpose. High molecular weight bodies, such as polyvinyl halides, e. g., the chloride, bromide, etc., cellulose esters such as the acetate, propionate, butyrate, etc., cellulose ethers such ethyl cellulose, benzyl cellulose, etc., polymethyl methacrylate, polystyrene, etc., may be plasticized by incorporating therewith compositions of this invention in a monomeric, partially polymerized or completely polymerized state, in the presence or absence of a suitable catalyst such as benzoyl peroxide when the monomeric or partially polymerized forms are used. These new compositions may be introduced into the high molecular weight body by simple mechanical agitation or by the use of mutual solvents, followed by the standard mechanical processes known in the plastics art. These bodies may then be subjected to further heat and pressure treatment if desired.

The mixed monomers or partial polymers used in carrying the present invention into effect may be interpolymerized in molds with or without the application of pressure, in the presence or absence of a material which is a solvent for the monomer but not for the interpolymer, or one which is a solvent for both monomer and interpolymer, or one which is not a solvent for either the monomer or interpolymer so that spongy or granulated polymeric modifications are obtained.

The solid thermoplastic and thermosetting interpolymers of this invention, with or without modifying agents, may be used in injection, compression, or transfer molding processes to make numerous articles for industrial, technical and novelty use and other applications.

As modifying agents various fillers may be used, for example wood flour, alpha flock, sand, asbestos, mica, paper, cloth, cellulose derivatives such as cellulose itself, regenerated cellulose, cellulose esters, cellulose ethers, natural and synthetic filaments or fibers, etc., in continuous, shredded or comminuted form. Pigments, dyes, opacifiers, plasticizing substances, such as dibutyl phthalate, esters of monobasic and polybasic saturated and unsaturated acids, esters of aromatic monobasic and polybasic acids, etc., may be incorporated into the polymers and copolymers of this invention to modify the same. Synthetic and natural resins, gums, oils, waxes, polyhalogenated aromatic derivatives, etc., likewise may be added as modifying agents.

In solvents, or without solvent utilizing a melt process, the fusible polymers may be used in adhesive and laminating applications to bond paper, wood, mica flakes, glass sheets, rubber sheets, fibrous materials such as silk, asbestos, glass fibers, synthetic fibers in filament, thread or fabric (woven or felted) form, etc., cellulose derivatives in sheet, comminuted or fiber form, etc. In the form of liquid coating compositions such as lacquers, enamels, varnishes, etc., they find application in surface-protective coatings, such as for walls, desks, wire, concrete, porcelains, etc. In a flowable condition without the use of solvents they may be used as impregnants for many porous bodies, such as cork, pottery, felts, or fabricated bodies with interstices, such as the windings of electrical coils, netted fiber, interwoven fibrous materials, etc.

When monomeric dimethyl itaconate and ethyl methacrylate are copolymerized with a highly active polymerizable substance such as diallyl itaconate in the presence of another non-polymerizable body which acts as a solvent for these monomers, there results a homogeneous gelled material which firmly binds the solvent so as to reduce to a minimum evaporation losses of the solvent. Illustrative of non-polymerizable bodies which thus may be gelled are butyl alcohol, benzene, ethylene dichloride, the monohalogenated aromatic hydrocarbons or mixtures of halogenated aromatic hydrocarbons, mineral oils including lubricating oils, etc.

What I claim as new and desire to secure by Letters Patent of the United States is:

1. A composition of matter comprising the product of polymerization of a polymerizable mixture containing dimethyl itaconate and ethyl methacrylate in the ratio of, by weight, from 10 to 70 per cent of the former to from 30 to 90 per cent of the latter.

2. A composition of matter comprising the product of polymerization of a polymerizable mixture containing (1) dimethyl itaconate, (2) ethyl methacrylate and (3) at least one other polymerizable compound containing at least one

grouping, said dimethyl itaconte and ethyl methacrylate being present in the said mixture in the ratio of, by weight, from 10 to 70 per cent of the former to from 30 to 90 per cent of the latter.

3. A composition of matter comprising the product of polymerization of a polymerizable mixture containing (1) dimethyl itaconate, (2) ethyl methacrylate and (3) at least one other polymerizable compound containing a plurality of

groupings, said dimethyl itaconate and ethyl methacrylate being present in the said mixture in the ratio of, by weight, from 10 to 70 per cent of the former to from 30 to 90 per cent of the latter.

4. A composition of matter comprising an interpolymer of from 30 to 90 per cent by weight ethyl methacrylate and from 10 to 70 per cent by weight dimethyl itaconate.

5. As a new product, a hard tough copolymer resulting from the interpolymerization of ethyl methacrylate and dimethyl itaconate in the ratio of, by weight, from 30 to 90 per cent of the former to from 10 to 70 per cent of the latter.

6. An interpolymer having a Dynstat flexural strength of more than 9,000 pounds per square inch and resulting from the polymerization of a mixture of ethyl methacrylate and dimethyl itaconate in the ratio of, by weight, from 40 to 80 per cent of the former to from 20 to 60 per cent of the latter.

7. A composition of matter comprising an interpolymer produced from a mixture of dimethyl itaconate, ethyl methacrylate and at least one ester of a polybasic acid in which at least two ester groups each contain at least one

grouping, said dimethyl itaconate and ethyl methacrylate being present in the said mixture in the ratio of, by weight, from 10 to 70 per cent of the former to from 30 to 90 per cent of the latter.

8. A composition of matter comprising an interpolymer produced from a mixture of dimethyl itaconate, ethyl methacrylate and at least one ester of acrylic acid, said dimethyl itaconate and ethyl methacrylate being present in the said mixture in the ratio of, by weight, from 10 to 70 per cent of the former to from 30 to 90 per cent of the latter.

9. A composition of matter comprising the product of polymerization of a polymerizable mixture containing (1) dimethyl itaconate, (2) ethyl methacrylate and (3) at least one monohydric alcohol ester of acrylic acid, said dimethyl itaconate and ethyl methacrylate being present in the said mixture in the ratio of, by weight, from 10 to 70 per cent of the former to from 30 to 90 per cent of the latter.

10. As a new product, an interpolymer obtained by polymerization of a mixture of dimethyl itaconate, ethyl methacrylate and ethyl acrylate, said dimethyl itaconate and ethyl methacrylate being present in the said mixture in the ratio of, by weight, from 10 to 70 per cent of the former to from 30 to 90 per cent of the latter.

11. A composition of matter comprising the product of polymerization of a polymerizable mixture containing (1) dimethyl itaconate, (2) ethyl methacrylate and (3) at least one diallyl ester of an alpha ethylenic unsaturated alpha beta polycarboxylic acid, said dimethyl itaconate and ethyl methacrylate being present in the said mixture in the ratio of, by weight, from 10 to 70 per cent of the former to from 30 to 90 per cent of the latter.

12. As a new product, an interpolymer obtained by polymerization of a mixture of ethyl methacrylate, dimethyl itaconate and diallyl itaconate, said ethyl methacrylate and dimethyl itaconate being present in the said mixture in the ratio of, by weight, from 30 to 90 per cent of the former to from 10 to 70 per cent of the latter.

13. An insoluble and infusible synthetic composition obtained by polymerization of a mixture containing, by weight, approximately 15 to 20 parts diallyl itaconate per 100 parts of dimethyl itaconate and ethyl methacrylate in the ratio of, by weight, from 10 to 70 per cent of the former to from 30 to 90 per cent of the latter.

14. The method of producing new compositions especially adapted for molding and coating applications which comprises forming a mixture containing dimethyl itaconate and ethyl methacrylate in the ratio of, by weight, from 10 to 70 per cent of the former to from 30 to 90 per cent of the latter, and treating the said mixture to effect copolymerization between the said components.

15. The method of producing new compositions especially adapted for molding and coating applications which comprises forming a mixture containing (1) dimethyl itaconate, (2) ethyl methacrylate and (3) at least one other polymerizable compound containing at least one

grouping, said dimethyl itaconate and ethyl methacrylate being present in the said mixture in the ratio of, by weight, from 10 to 70 per cent of the former to from 30 to 90 per cent of the latter, and heating the resulting mixture while intimately associated with a polymerization catalyst to effect copolymerization between the said components.

GAETANO F. D'ALELIO.

CERTIFICATE OF CORRECTION.

Patent No. 2,298,039.                                              October 6, 1942.

GAETANO F. D'ALELIO.

It is hereby certified that error appears in the printed specification of the above numbered patent requiring correction as follows: Page 3, first column, line 3, beginning with "Example 6" strike out all to and including "Sodium hydroxide------------0.3" in line 10 and insert instead the following -

Example 6

20.0 parts ethyl methacrylate.
    10.0 parts dimethyl itaconate
    0.3 part benzoyl peroxide (dissolved in the above)
  130.0 parts water
    0.3 part poly-itaconic acid in 10 parts water
        and 0.3 part sodium hydroxide and that the said Letters Patent should be read with this correction therein that the same may conform to the record of the case in the Patent Office.

Signed and sealed this 10th day of November, A. D. 1942.

Henry Van Arsdale,
Acting Commissioner of Patents.

(Seal)